Aug. 26, 1969        H. SCHALLERT        3,463,392
AUXILIARY HEATER FOR AUTOMOTIVE VEHICLES
Filed June 19, 1967        2 Sheets-Sheet 1
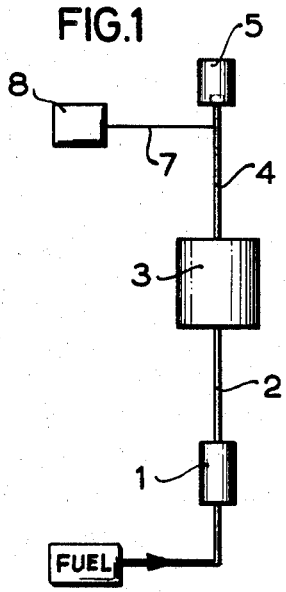
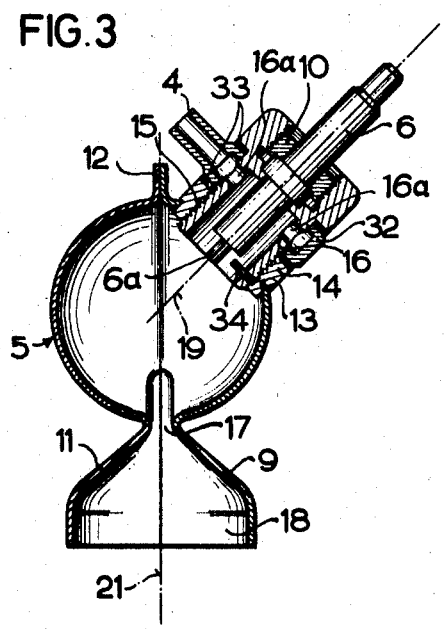
INVENTOR
Heino Schallert
by Michael S. Striker

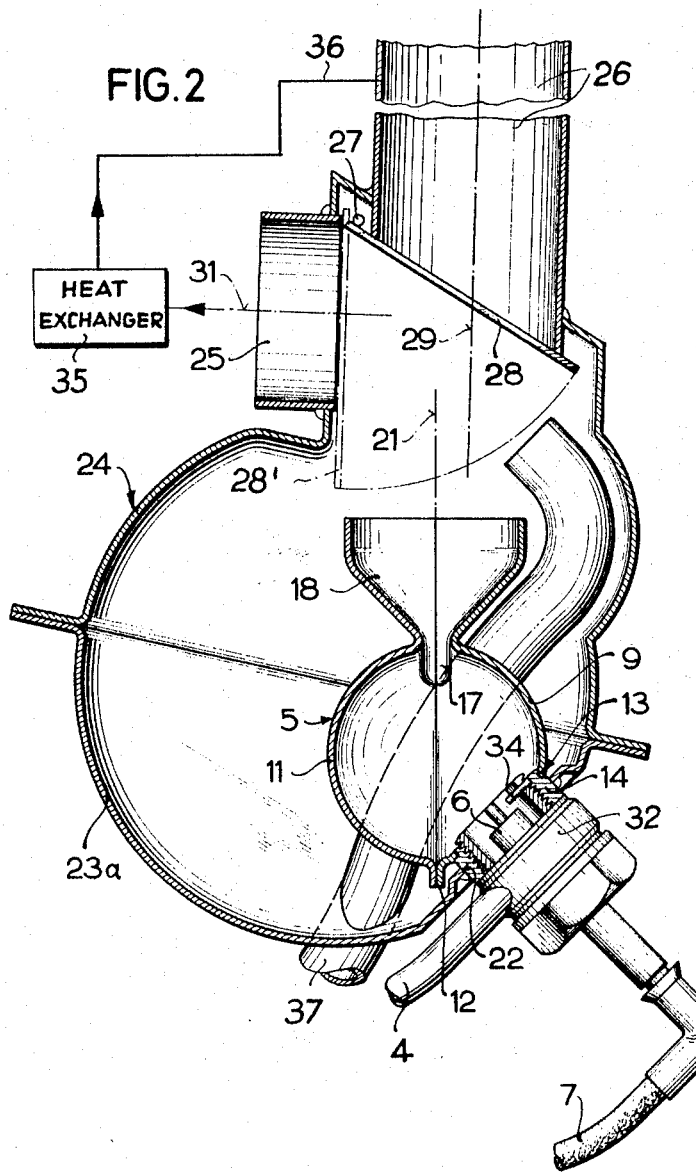

United States Patent Office 3,463,392
Patented Aug. 26, 1969

3,463,392
AUXILIARY HEATER FOR AUTOMOTIVE VEHICLES
Heino Schallert, Stuttgart-Weilimdorf, Germany, assignor to Robert Bosch GmbH, Stuttgart, Germany
Filed June 19, 1967, Ser. No. 646,858
Claims priority, application Germany, Aug. 16, 1966, B 88,497
Int. Cl. F23c 3/02; B60h 1/02
U.S. Cl. 237—12.3                                10 Claims

ABSTRACT OF THE DISCLOSURE

A hollow spherical combustion chamber of an auxiliary heater is installed in the resonance chamber of the muffler in an automotive vehicle and the resonance chamber has a valve-controlled outlet which can admit combustion products to a heat exchanger which heats air that is being admitted into the passenger compartment or cabin of the vehicle. The combustion chamber has a slit-shaped discharge aperture for admission of combustion products into the resonance chamber and an inlet opening which accommodates certain parts of an assembly serving to admit and burn a fuel-air mixture in the combustion chamber. Such assembly comprises a carburetor, a pump which conveys a mixture of fuel and air from the carburetor to the combustion chamber, and a spark plug which is energized to produce sparks at desired intervals so as to effect pulsating ignition of the mixture which is being supplied to the combustion chamber.

BACKGROUND OF THE INVENTION

The present invention relates to heaters in general, and more particularly to improvements in auxiliary heaters of the type which may be utilized to heat the passenger compartment or the cabin of an automotive vehicle. Still more particularly, the invention relates to improvements in fuel-burning auxiliary heaters whose heating action is not dependent on the condition of the engine in an automotive vehicle.

Heretofore known auxiliary heaters for automotive vehicles are quite bulky, expensive and consist of a large number of parts. Furthermore, certain conventional auxiliary heaters will operate properly only with high-quality fuels.

SUMMARY OF THE INVENTION

It is an object of the present invention to provide a simple, compact, inexpensive, rugged and durable auxiliary heater which can be readily installed in many types of automotive vehicles, which can be operated with high-quality or low-grade fuels, and which can be installed in existing vehicles with minimal alterations and at a reasonable cost.

Another object of the invention is to provide an auxiliary heater which can enhance the heating action of conventional heaters for passenger compartments or cabins of automotive vehicles.

A further object of the invention is to provide an auxiliary heater which is practically self-cleaning and which requires little attention and/or maintenance.

Briefly outlined, one feature of my invention resides in the provision of an auxiliary heater for automotive vehicles. The heater comprises a heat exchanger which may be constituted by the heat exchanger of the main heater, a hollow spherical combustion chamber which is preferably installed in the resonance chamber of the muffler and has a slit-shaped discharge aperture for admission of combustion products into the resonance chamber whence the products can flow to the heat exchanger and/or directly into the tail pipe of the muffler, and an assembly which admits and burns a fuel in the combustion chamber. Such assembly may include a carburetor, a supply conduit connecting an inlet opening of the combustion chamber with the carburetor, a pump in the conduit, and an igniter which causes a spark plug on the combustion chamber to produce sparks at desired intervals and to ignite the fuel-air mixture which is being fed by the pump. The pump may be controlled by the driver of the vehicle, and the driver also controls a valve which is installed in the resonance chamber to regulate the flow of combustion products from the resonance chamber to the tail pipe and/or to the heat exchanger. The heat exchanger discharges spent products into the atmosphere or into the tail pipe, and this heat exchanger can also receive such products of combustion which enter the resonance chamber from the exhaust pipe of the muffler, i.e., from the cylinder or cylinders of the internal combustion engine.

The auxiliary heater may be used simultaneously with or independently of the main heater. The main heater is constituted by the heat exchanger and muffler, i.e., the heat exchanger can receive no combustion products at all, only such combustion products which are produced on combustion of fuel in the engine of the vehicle, only such products which issue from the spherical combustion chamber of the auxiliary heater, or products which issue from the engine via exhaust pipe and products which issue from the combustion chamber of the auxiliary heater.

The novel features which are considered as characteristic of the invention are set forth in particular in the appended claims. The improved heater itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagram showing certain component parts of an auxiliary heater which embodies the present invention;

FIG. 2 is a transverse sectional view of a muffler, further showing the combustion chamber and certain other parts of the improved heater which are installed in or on or are connected with the muffler; and FIG. 3 is a central sectional view of the combustion chamber of the heater in inverted position.

DESCRIPTION OF THE PREFERRED EMBODIMENTS

Referring first to FIG. 1, there is shown a diagram of several component parts of the improved auxiliary heater. These parts include a carburetor 1 which discharges a mixture of fuel and air into a first supply conduit 2 connected with the inlet of a pump 3. The pump forces such mixture into a second supply conduit 4 which is connected to a combustion chamber 5 provided with a spark plug 6, the latter being connected with an igniter 8 by means of a conductor surrounded by a cable 7.

As shown in FIGS. 2 and 3, the combustion chamber 5 resembles a hollow sphere and includes two substantially semispherical mirror symmetrical sections or halves 9, 11 made of sheet metal. The open sides of the sections 9, 11 are provided with flanges 12 and each of these sections can be made of a single piece of metallic sheet stock by resorting to suitable dies. The section 9 is provided with an inlet opening 13 which receives one end of a metallic sleeve 14, the latter being welded to the section 9 and being provided with internal threads 15 to mesh with a hollow externally threaded nipple 16.

The sections 9, 11 are shaped in such a way that their abutting flanges 12 leave a slit-shaped discharge aperture 17 and each of these sections carries one half of a divergent exhaust nozzle 18 for discharge of combustion products. The central symmetry plane 21 of the aperture 17 coincides with the plane in which the flanges 12 abut against each other. The common axis 19 of the nipple 16 and opening 13 makes with the symmetry plane 21 an obtuse angle, preferably an angle of about 135 degrees. The axis of the exhaust nozzle 18 is located in the symmetry plane 21. The axes of the nozzle 18 and nipple 16 are located in the plane of FIG. 3, this plane being normal to the symmetry plane 21. The aforementioned selection of the angle between the axes of the nozzle 18 and nipple 16 insures highly satisfactory circulation, agitation and complete combustion of fuel even if the auxiliary heater is operated with low-quality fuels.

The welding of the sleeve 14 to section 9 is completed in a first step, and the flanges 12 are thereupon welded to each other in a next-following step. The sleeve 14 is received in an opening 22 provided in a semicylindrical portion 23 of a resonance chamber 24 which forms part of the muffler in an automotive vehicle. The sleeve 14 is welded to the portion 23 and the latter is provided with a flange and is welded to the flange of a similar semicylindrical portion 23a of the chamber 24.

The portion 23a of the resonance chamber 24 is formed with a substantially tangential outlet 25 which is connected with a heat exchanger 35 serving to heat air which is admitted to the passenger compartment or cabin of an automotive vehicle. The outlet 25 is welded to the main part of the semicylindrical portion 23a and the latter comprises a second outlet 26 which is also welded to its main part and constitutes the tail pipe of the muffler. Combustion products which are evacuated via outlet 25 will be admitted into the tail pipe 26 after having passed through the heat exchanger 35. This is indicated by an evacuating conduit 36 which connects the heat exchanger 35 with the tail pipe 26. A flap valve 28 is installed in the portion 23a and is hinged at 27 so that it can assume a number of intermediate positions and two end positions. In the solid-line end position which is shown in FIG. 2, the valve 28 seals the intake end of the tail pipe 26 from the nozzle 18 and from the interior of the resonance chamber 24 so that all combustion products, namely, those entering the chamber 24 through the exhaust pipe 37 of the engine and those entering the chamber 24 through the nozzle 18, are compelled to pass through the heat exchanger 35 and to bring about a very intensive heating action. When the valve 28 is moved to the phantom-line position 28' of FIG. 2, it seals the outlet 25 and heat exchanger 35 from the resonance chamber 24 so that the passenger compartment or cabin is not heated at all, i.e., all of the combustion products will escape to the atmosphere by flowing from the chamber 24 directly into the tail pipe 26. The means for changing the angular position of the valve 28 may include a conventional remote control device which can be actuated by the driver of the vehicle.

It will be noted that the axis of the nozzle 18 is parallel to the axis 29 of the tail pipe 26. Thus, when the valve 28 is moved close to or actually assumes the phantom-line position 28', all of the combustion products issuing from the combustion chamber 5 can flow directly into the tail pipe 26. The axis 31 of the outlet 25 is normal or nearly normal to the axis 29 of the tail pipe 26.

The nipple 16 is provided with one or more radial mixture-admitting ducts 16a and is surrounded by an annular terminal portion 32 of the supply conduit 4 which latter supplies the mixture of fuel and air to the ducts 16a. The terminal portion 32 is placed between two gaskets 33 which are compressed between the outer end face of the sleeve 14 and an external annular shoulder of the nipple 16 when the latter is driven home. The nipple 16 serves as a carrier for the spark plug 6 and is provided with internal threads meshing with an externally threaded plug 10 which fixes the spark plug in desired position. The center electrode 6a of the spark plug 6 extends into the inner end portion of the nipple 16 and defines a spark gap with a grounded second electrode constituted by a pin or post 34 carried by and extending radially into the interior of the nipple 16.

The terminal portion 32 is of the type known as DIN norm 7622.

The operation is as follows:

The pump 3 (FIG. 1) is started to force the mixture from the supply conduit 2 into the supply conduit 4 and thence into the terminal portion 32 which discharges the mixture into the ducts 16a of the nipple 16. The circuit of the spark plug 6 is completed at frequent intervals by the igniter 8 (the center electrode 6a is connected to the conductor in the cable 7), so that the plug 6 produces between the electrodes 6a, 34 sparks which ignite the mixture in pulsating fashion and at frequent intervals. Gases entering the combustion chamber 5 travel along the internal surfaces of the shells 9, 11 and their energy increases in response to progressing combustion. Such gases leave the interior of the chamber 5 via discharge aperture 17 and expand in the nozzle 18 prior to entering the resonance chamber 24 of the muffler. If the passenger compartment or the cabin is to be heated, the valve 28 is adjusted so that it admits some or all combustion products into the outlet 25. The combustion of fuel-air mixture is completed in the interior of the chamber 5 so that the chamber 24 receives only products of such combustion but no flames. It was found that the products of combustion entrain from the chamber 5 all of the solids so that the interior of this chamber remains clean.

The improved auxiliary heater occupies very little room and can be manufactured and installed at a low cost. Its parts are simple and can be manufactured and assembled by resorting to available machinery. The combustion chamber 5 can be readily accommodated in a conventional muffler. Furthermore, and since the fluid in the chamber 5 undergoes thorough intermixing action, the heater of my invention can utilize low-grade fuels.

Without further anaylsis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. A heater for automotive vehicles comprising a heat exchanger, a muffler forming a resonance chamber and having a tail pipe providing communication between said resonance chamber and the outer atmosphere; wall means defining a hollow substantially spherical combustion chamber located in said resonance chamber of said muffler and communicating therewith; means for admitting and burning a fuel in said combustion chamber whereby the combustion gas produced in said combustion chamber will be discharged into the resonance chamber of said muffler, and an outlet connecting said resonance chamber with said heat exchanger so that products of combustion can leave the resonance chamber via said tail pipe and/or via said outlet.

2. A heater as defined in claim 1, further comprising valve means for regulating the outflow of combustion products from said resonance chamber via said tail pipe and said outlet.

3. A heater as defined in claim 2, wherein said tail pipe has an intake end which is adjacent to said outlet and said valve means comprises a flap hingedly connected to said resonance chamber between said intake end and said outlet and movable to a plurality of positions each of which corresponds to a different ratio of flow of combustion products through said tail pipe and said outlet.

4. A heater as defined in claim 1, wherein said wall means defining said combustion chamber comprise two substantially semispherical sections having abutting flanges.

5. A heater as defined in claim 4, wherein said combustion chamber is provided with a slit-shaped discharge aperture for products of combustion and wherein said aperture has a symmetry plane which coincides with the plane wherein said flanges abut against each other.

6. A heater as defined in claim 1, said combustion chamber having an exhaust nozzle for admission of combustion products into said resonance chamber, and said tail pipe having an axis which is substantially parallel with the axis of said exhaust nozzle.

7. A heater for automotive vehicles comprising a heat exchanger; a muffler forming a resonance chamber having an opening and an outlet; wall means forming a hollow combustion chamber located in said resonance chamber and communicating therewith, said wall means defining an opening registering with said opening of said resonance chamber; an assembly for admitting and burning fuel in said combustion chamber and comprising a sleeve extending through said opening and secured to said wall means and said muffler; passage means connecting said outlet to said heat exchanger; and evacuating means connected to said heat exchanger for discharging spent combustion products into the atmosphere.

8. A heater for automotive vehicles comprising a heat exchanger; wall means defining a hollow substantially spherical combustion chamber having a substantially round inlet opening, a slit-shaped discharge aperture and a divergent exhaust nozzle for gases which issue from said aperture, said inlet opening and said exhaust nozzle having axes crossing each other; means in said inlet opening for admitting and burning fuel in said combustion chamber so that combustion gases produced in said chamber will leave the latter through said exhaust nozzle; and passage means providing communication between said exhaust nozzle and said heat exchanger.

9. A heat exchanger as defined in claim 8, wherein said axes make an angle of approximately 135 degrees.

10. A heater as defined in claim 8, wherein the axes of said nozzle and said opening are located in a common first plane which is normal to the longer axis of said aperture.

References Cited

UNITED STATES PATENTS

| 1,830,658 | 11/1931 | Hynes. | |
| 2,165,269 | 7/1939 | Krasel. | |
| 2,717,637 | 9/1955 | Huber | 431—1 |
| 3,252,496 | 5/1966 | Haag | 431—1 |
| 3,276,505 | 10/1966 | Huber et al. | 431—1 |

EDWARD J. MICHAEL, Primary Examiner

U.S. Cl. X.R.

431—1